United States Patent
Terwilliger et al.

(10) Patent No.: US 12,270,333 B2
(45) Date of Patent: Apr. 8, 2025

(54) PARTIAL EXHAUST GAS CONDENSATION WITH INVERSE BRAYTON CONTROL

(71) Applicant: RTX CORPORATION, Farmington, CT (US)

(72) Inventors: Neil J. Terwilliger, Cheshire, CT (US); Lance L. Smith, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/238,655

(22) Filed: Aug. 28, 2023

(65) Prior Publication Data
US 2025/0075655 A1    Mar. 6, 2025

(51) Int. Cl.
*F02C 3/30*    (2006.01)
*F02C 7/141*    (2006.01)
*F02C 7/16*    (2006.01)

(52) U.S. Cl.
CPC ........... *F02C 3/30* (2013.01); *F02C 7/141* (2013.01); *F02C 7/16* (2013.01); *F05D 2220/323* (2013.01); *F05D 2260/213* (2013.01); *F05D 2270/08* (2013.01)

(58) Field of Classification Search
CPC .. F02C 3/30; F02C 3/305; F02C 7/141; F02C 7/16
See application file for complete search history.

(56) References Cited

U.S. PATENT DOCUMENTS

| | | | |
|---|---|---|---|
| 11,603,798 B1 | 3/2023 | Terwilliger et al. | |
| 2021/0115857 A1* | 4/2021 | Collopy | F02C 7/262 |
| 2021/0207500 A1* | 7/2021 | Klingels | F02C 3/305 |
| 2021/0356117 A1* | 11/2021 | Lear | F22B 1/1815 |
| 2023/0258130 A1* | 8/2023 | Terwilliger | F02C 7/224 60/266 |
| 2023/0286661 A1* | 9/2023 | Klingels | B64D 27/18 |

FOREIGN PATENT DOCUMENTS

| | | |
|---|---|---|
| DE | 102015226305 A1 | 6/2017 |
| EP | 1243757 B1 | 12/2005 |
| EP | 1348071 B1 | 9/2006 |
| JP | 2009293618 A | 12/2009 |

OTHER PUBLICATIONS

Extended European Search Report for European Application No. 24197057.3 mailed Feb. 10, 2025.

* cited by examiner

*Primary Examiner* — Scott J Walthour
(74) *Attorney, Agent, or Firm* — Carlson, Gaskey & Olds, P.C.

(57) ABSTRACT

A turbine engine assembly generates an exhaust gas flow that is communicated through a core flow path. The exhaust gas flow is split into a first exhaust gas flow and a second exhaust gas flow. Water is extracted in a condenser from the second exhaust gas flow. The extracted water is transformed into a steam flow in an evaporator system utilizing thermal energy from at least the second exhaust gas flow. An exit flow from the condenser is communicated through an exhaust compressor and compressed to a higher pressure exit flow.

18 Claims, 2 Drawing Sheets

PARTIAL EXHAUST GAS CONDENSATION WITH INVERSE BRAYTON CONTROL

TECHNICAL FIELD

The present disclosure relates generally to an aircraft propulsion system that includes a steam generation system transforming water extracted from a partial portion of an exhaust gas flow into steam for injection into a core flow.

BACKGROUND

Reduction and/or elimination of carbon emissions generated by aircraft operation is a stated goal of aircraft manufacturers and airline operators. Turbine engines compress incoming core airflow, and mix the compressed airflow with fuel that is ignited in a combustor to generate an exhaust gas flow. Steam injection can provide improved propulsive efficiencies. Water recovered from the exhaust gas flow may be transformed into steam using thermal energy from the exhaust gas flow. Available cold sink temperatures may not be sufficient to efficiently condense water from the entire volume of exhaust gas flow.

SUMMARY

A turbine engine assembly according to an exemplary embodiment of this disclosure includes, among other possible things, a compressor section where an inlet airflow is compressed, a combustor section where the compressed inlet airflow is mixed with fuel and ignited to generate an exhaust gas flow that is communicated through a core flow path, a turbine section through which the exhaust gas flow expands to generate a mechanical power output, the exhaust gas flow is split into a first exhaust gas flow and a second exhaust gas flow, a condenser where water from the second exhaust gas flow is condensed and extracted, an evaporator system where thermal energy from at least the second exhaust gas flow is utilized to generate a steam flow from at least a portion of water that is extracted by the condenser for injection into a core flow path, and an exhaust compressor where an exit flow from the condenser is compressed to a higher pressure exit flow.

In a further embodiment of the foregoing engine assembly, thermal energy from the first exhaust gas flow and the second exhaust gas flow is utilized to generate the steam flow.

In a further embodiment of any of the foregoing turbine engine assemblies, the second exhaust gas flow is less than or equal to half of a total exhaust gas flow that is generated in the combustor section.

In a further embodiment of any of the foregoing, the turbine engine assembly further includes a heat transfer circuit that is in thermal communication with a cold sink flow and the condenser. The heat transfer circuit is configured to cool the second exhaust gas flow in the condenser.

In a further embodiment of any of the foregoing, the turbine engine assembly includes an exhaust mixer for merging the first exhaust gas flow and the higher pressure exit flow downstream from the condenser.

In a further embodiment of any of the foregoing, the turbine engine assembly includes a turboexpander where steam flow generated by the evaporator system is expanded before communication to the combustor section.

In a further embodiment of any of the foregoing turbine engine assemblies, the exit steam flow from the turboexpander is reheated by the exhaust gas flow prior to communication to the combustor section.

In a further embodiment of any of the foregoing turbine engine assemblies, the exhaust compressor is driven by an electric motor.

In a further embodiment of any of the foregoing, the turbine engine assembly further includes a controller programmed for operating the electric motor to control flow through the condenser to tailor condenser operation to an available cooling capacity.

In a further embodiment of any of the foregoing turbine engine assemblies, the exhaust compressor is coupled to a drive shaft that is driven by a mechanical drive device.

An aircraft propulsion system according to another exemplary embodiment of this disclosure includes, among other possible things, a propulsor for generating propulsive thrust, a core engine wherein inlet airflow is compressed, mixed with fuel, and ignited to generate an exhaust gas flow that is expanded through a turbine section to generate shaft power that is utilized to drive the propulsor. The exhaust gas flow is split into a first exhaust gas flow and a second exhaust gas flow and the second exhaust gas flow is less than half of a total of the exhaust gas flow. The aircraft propulsion system further includes a condenser where water from the second exhaust gas flow is condensed and extracted, an evaporator system where thermal energy from at least one of the first exhaust gas flow and the second exhaust gas flow is utilized to generate a steam flow from at least a portion of water that is extracted by the condenser for injection into a core flow path, a cold sink that is in thermal communication with the second exhaust gas flow in the condenser for cooling the second exhaust gas flow, and an exhaust compressor that is configured to control the second exhaust gas flow through the condenser to tailor water extraction to an available cooling capacity provided by the cold sink.

In a further embodiment of the foregoing aircraft propulsion system, the cold sink includes a heat transfer circuit that is in thermal communication with a cold sink flow and the condenser. The heat transfer circuit is configured to cool the second exhaust gas flow in the condenser.

In a further embodiment of any of the foregoing aircraft propulsion systems, the exhaust compressor is driven by an electric motor that is operated by a controller that is programmed for operating the electric motor to control the second exhaust gas flow through the condenser.

In a further embodiment of any of the foregoing aircraft propulsion systems, the exhaust compressor is coupled to a drive shaft that is driven by a mechanical drive device.

In a further embodiment of any of the foregoing, the aircraft propulsion system includes an exhaust mixer for merging the first exhaust gas flow and the second exhaust flow downstream from the condenser.

In a further embodiment of any of the foregoing, the aircraft propulsion system includes a turboexpander where steam flow generated by the evaporator system is expanded before communication to the core flow path and the exit steam flow from the turboexpander is reheated by the exhaust gas flow prior to communication to the core flow path.

In a further embodiment of any of the foregoing, the aircraft propulsion system further includes a fuel system for communicating a non-carbon based fuel to a combustor section of the core engine.

A method of operating an aircraft propulsion system according to another exemplary embodiment of this disclosure includes, among other possible things, generating an exhaust flow that contains a mixture of steam, compressed air and fuel, splitting the generated exhaust flow into a first exhaust flow and a second exhaust flow with the second exhaust flow that is less than half of the total generated exhaust flow, thermally communicating the second exhaust flow with a cold sink in a condenser for cooling the second exhaust flow, condensing and extracting water from the cooled second exhaust flow, and controlling the flow of second exhaust flow through the condenser by selectively operating an exhaust compressor that is based on a cooling capacity of the cold sink.

In a further embodiment of the foregoing method, the cold sink includes a heat transfer circuit that is in thermal communication with the cold sink flow and the condenser. The heat transfer circuit is configured to cool the second exhaust flow in the condenser.

In a further embodiment of any of the foregoing methods, a steam flow is generated with thermal energy from the generated exhaust flow and injects at least portion of the steam flow into a core flow path.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
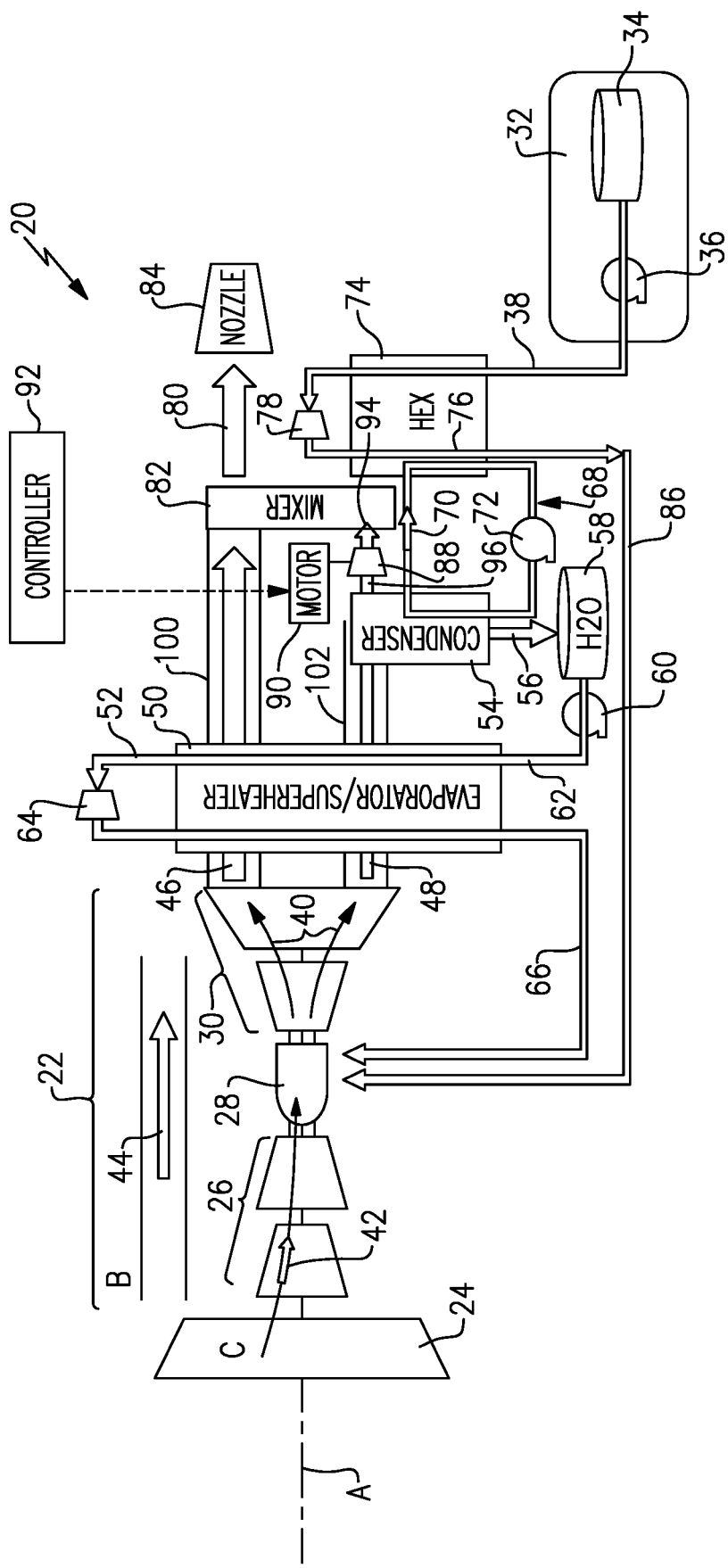
FIG. 1 is a schematic view of an example aircraft propulsion system embodiment.

FIG. 1 schematically illustrates an example propulsion system 20 that condenses and extracts water from a partial portion of the exhaust gas flow to reduce difficulties incurred extracting water from all of the exhaust gas flow. The propulsion system 20 further includes an exhaust compressor to compensate for loss of pressure in the partial portion of the exhaust gas flow across the condenser and to control flow through the condenser to match a cooling capacity of a cooling flow, such as fuel.

The example propulsion system 20 includes a fan section 24 and a core engine 22. The core engine 22 includes a compressor section 26, a combustor section 28 and a turbine section 30 disposed along an engine longitudinal axis A. The fan section 24 drives a fan bypass airflow 44 along a bypass flow path B, while the compressor section 26 draws inlet air along a core flow path C as a core flow 42. The core flow 42 is compressed and communicated to the combustor section 28 where a compressed core airflow 42 is mixed with a fuel flow 86 and ignited to generate the exhaust gas flow 40. The exhaust gas flow 40 expands through the turbine section 30 where energy is extracted and utilized to drive the fan section 24 and the compressor section 26.

Although an example engine architecture is disclosed by way of example, other turbine engine architectures are within the contemplation and scope of this disclosure. Moreover, although the disclosed non-limiting embodiment depicts a turbofan turbine engine, it should be understood that the concepts described herein are not limited to use with turbofans as the teachings may be applied to other types of turbine engines. Additionally, the features of this disclosure may be applied to other engine configurations utilized to generate shaft power.

A fuel system 32 including at least a fuel tank 34 and a fuel pump 36 to provide the fuel flow 38 to the combustor 28. The example fuel system 32 is configured to provide a hydrogen based fuel such as a liquid hydrogen ($LH_2$). Although hydrogen is disclosed by way of example, other non-carbon based fuels could be utilized and are within the contemplation of this disclosure. Moreover, the disclosed features may also be beneficial in an engine configured to operate with traditional carbon fuels and/or biofuels, such as sustainable aviation fuel.

An evaporator/superheater system 50 and a condenser 54 are disposed downstream of the turbine section 30 and receive portions of the exhaust gas flow 40. The evaporator/superheater system 50 utilizes thermal energy from the exhaust gas flow 40 to generate a steam flow 52 from water 56 extracted by the condenser 54. Extracted water 56 is gathered in a tank 58 and pressurized by a pump 60 and communicated as a pressurized water flow 62 to the evaporator/superheater system 50.

In one example embodiment, the steam flow 52 is expanded through a steam turbine 64 to generate shaft power and cool the steam flow. The expanded steam flow is routed back through the evaporator/superheater system 50 to generate a superheated steam flow 66 that is communicated to combustor 28.

The propulsion system 20 has an increased power output utilizing the injected steam flow 66 due to increased mass flow through the turbine section 30 without a corresponding increase in work from the compressor section 26. Although the example steam flow 66 is shown as injected into the combustor 28, the steam flow 66 may be injected at other locations along the core flow path C and remain with the contemplation of this disclosure. For example, some or all of the steam flow 66 could be injected in an inlet of the propulsion system 20, the compressor section 26, and/or the turbine section 30.

Moreover, although the disclosed embodiment illustrates the evaporator/superheater 50 as a single device, it may be configured as separate devices to accommodate application specific limitations. Moreover, the evaporator/superheater 50 may be separate parts to enable exposure to different temperatures of the exhaust gas flow 40 to provide the evaporation and superheating functions.

The exhaust gas flow 40 is a mix of steam, and components from combustion of fuel. The components from combustion can include, among other possible components, nitrogen, carbon dioxide and oxygen. These combustion components reduce the ease of condensing liquid water from the exhaust gas flow 40 in condenser 54. Moreover, the bypass airflow 44 and fuel flow 38 have limited capacities for cooling that may further limit condenser operation.

The example propulsion system provides for improved condenser operation by separating the exhaust gas flow 40 into a first exhaust gas flow 46 communicated through a first passage 100 and a second exhaust gas flow 48 communicated through a second passage 102. Only the second exhaust gas flow 48 is communicated to the condenser 54 for extraction of water.

In one example embodiment, the second exhaust gas flow 48 is about or less than half of the total exhaust gas flow 40 emitted from an outlet of the turbine section 30. In another example embodiment, the second exhaust gas flow 48 has a flow volume of between 10% and 25% that of the first exhaust gas flow 46. In another example embodiment, the second exhaust gas flow 48 has a volume that is greater than 50% of the total exhaust gas flow 40 emitted from the outlet of the turbine section 30. Additionally, the split between the first exhaust gas flow 46 and the second exhaust gas flow 48 may range from around 90% of the exhaust gas flow 40 communicated through the condenser 54 to as little as about 10% of the total exhaust gas flow 40 communicated through the condenser 54.

A heat transfer circuit 68 is in thermal communication with the condenser 54 to cool the second exhaust gas flow 48 sufficiently to enable condensation and extraction of water 56. The heat transfer circuit 68 provides for movement of thermal energy away from the condenser 54 and to the fuel flow 38 within a heat exchanger 74. The example heat transfer circuit 68 may be of any configuration that provides for movement of thermal energy away from the condenser 54. In one example embodiment, the heat transfer circuit 68 comprises a refrigerant circuit circulating a refrigerant 70 between the second exhaust gas flow 48 and the heat exchanger 74.

In one example embodiment, the fuel flow 38 accepts heat from a second fuel flow 76 within the heat exchanger 74, which is warmed after receiving additional heat from the refrigerant 70. The now heated fuel flow 38 is expanded and cooled in a turboexpander 78 and communicated into thermal communication with the refrigerant 70 as the cooled second fuel flow 76. After accepting additional heat from the refrigerant 70, the now heated fuel flow 86 is exhausted from the heat exchanger 74 and is directed to the combustor 28. The fuel flow 86 may be routed to other engine components to accept additional thermal energy prior to being introduced into the combustor 28.

Water extracted from the second exhaust gas flow 48 is pressurized by the pump 60 and communicated as the pressurized flow of water to the evaporator/superheater 50. The pressurized water is heated by the second exhaust gas flow 48 and optionally also the first exhaust gas flow 46 to provide the steam flow 66 that is communicated to the combustor 28.

The first and second exhaust gas flows 46 and 48 are recombined into a combined exhaust flow 80 in a mixer 82. The combined exhaust gas flow 80 is exhausted to the ambient environment through a nozzle 84. Although the exhaust gas flow 40 is separated into the two parts for water extraction, thermal energy from both the first and second exhaust gas flows 46, 48 may be communicated to the evaporator/superheater 50 to facilitate steam generation.

The second exhaust gas flow 48 passes through the condenser 54 and exits as a lower pressure exit flow 96. The lower pressure exit flow 96 is of a pressure lower than either of the first and second exhaust gas flows 46, 48. The lower pressure of the exit flow 96 is due to a pressure drop encountered as the second flow proceeds through the condenser 54. The lower pressure of the exit flow 96 is not compatible with the first exhaust gas flow 46 and can present challenges to recombination in the mixer 82. Moreover, the lower pressure of the exit flow 96 can reduce propulsive thrust generated at the nozzle 84.

The example propulsion system 20 includes an exhaust compressor 88 where the pressure of the exit flow 96 is increased to a pressure compatible with the first exhaust gas flow 46. The exhaust compressor 88 generates a pressurized exit flow 94 that matches the pressure of the first exhaust gas flow 46. The pressure of the pressurized exit flow 94 and the first exhaust gas flow 46 are matched by being within a defined range. The first exhaust gas flow 46 and the pressurized exit flow 94 need not be of the same pressure, but are within a defined range that is determined to be compatible and combinable.

In one disclosed example embodiment, the exhaust compressor 88 is selectively driven by an electric motor 90 controlled by a controller 92. The controller 92 operates the electric motor 90 to drive the exhaust compressor 88 as needed to generate the pressures needed to match the first exhaust gas flow 48 in the mixer 82. The needed increase in pressure may vary during engine operation and the controller 92 provides for the selective control and operation.

The example controller 92 is a device and system for performing necessary computing or calculation operations to facilitate operation of the electric motor 90. The controller 92 may be specially constructed for operation of the electric motor 90, or it may comprise at least a general-purpose computer selectively activated or reconfigured by software instructions stored in a memory device. The controller 92 may further be part of full authority digital engine control (FADEC) or an electronic engine controller (EEC).

The exhaust compressor 88 also operates to control a flow rate of the second exhaust gas flow 48 to tailor operation of the condenser 54 to match the cooling capacity of the fuel flow 38. The cooling capacity of the fuel flow 38 may vary as the fuel flow rate varies during engine operation. When the fuel flow 38 is at lower rates, such as during engine idle conditions, the flow of the second exhaust gas flow 48 is reduced and more of the exhaust gas flow 40 is driven through the first passage 100 as the first exhaust gas flow 46. As fuel flow increases, such as during takeoff and cruise engine operating conditions, the volume of the second exhaust gas flow 48 is increased to match increased cooling capacity provided by an increased fuel flow.

Figure 2:
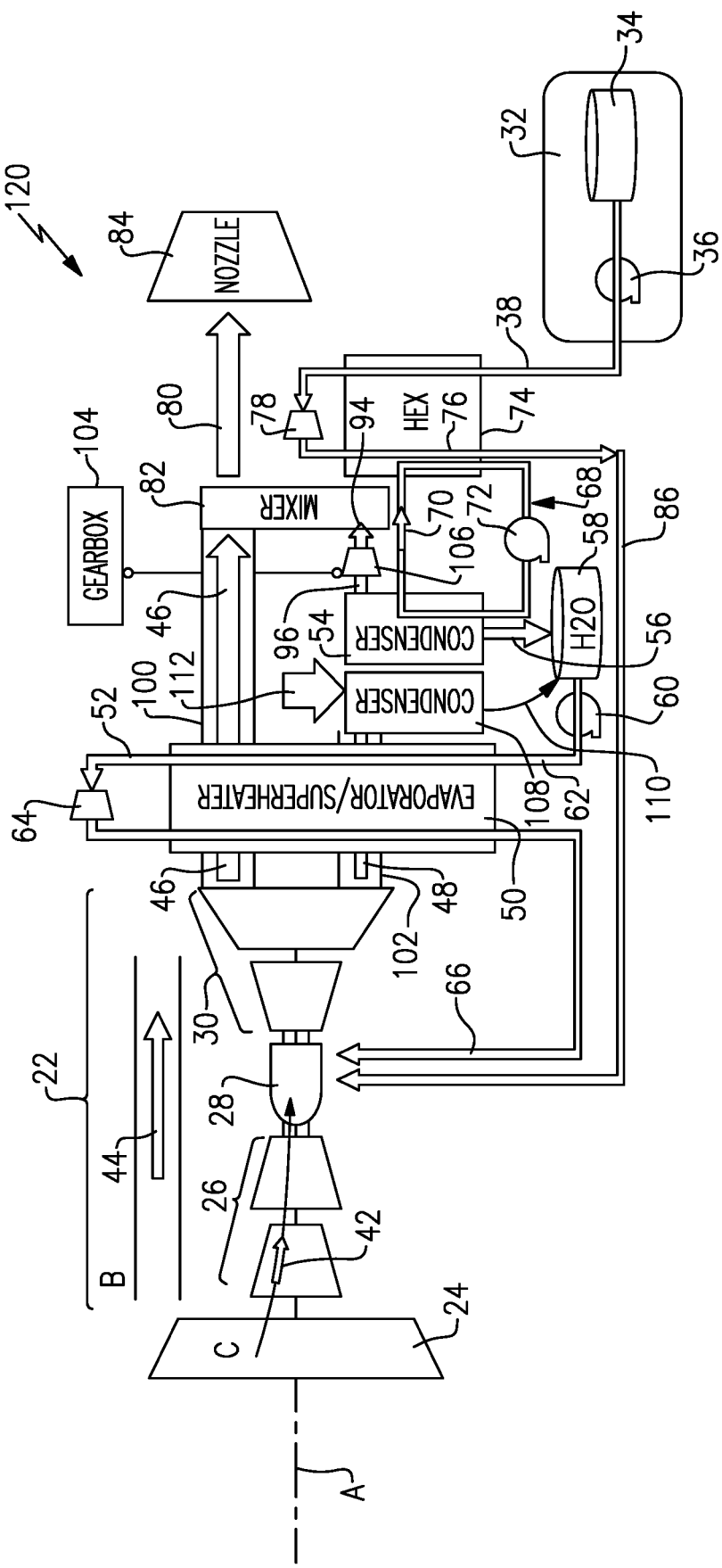
FIG. 2 is a schematic view of another example aircraft propulsion system embodiment.

Referring to FIG. 2, another example propulsion system 120 is schematically shown and includes a second condenser 108 that precools the second exhaust gas flow 48 and extracts an initial portion of water as indicated at 110. A cold sink 112 is provided for cooling the second exhaust gas flow 48 within the second condenser 108. The cold sink 112 may be the same as that utilized with the condenser 54 or may be from a different available source. In one example embodiment, the cold sink 112 is provided by the bypass airflow 44.

The second exhaust gas flow 48 is initially cooled in the second condenser 108 to provide for the extraction of water 110. The cooled second exhaust gas flow 48 from the second condenser 108 is communicated to the condenser 54 for extraction of additional water. The cooler second exhaust gas flow 48 provided to the condenser 54 is further cooled by the heat transfer circuit 68 and the fuel flow 38. The additional condenser 108 provides an additional cooling of the second exhaust gas flow 48 that further improves water extraction capability.

The example propulsion system 120 further includes an exhaust compressor 106 that is driven mechanically through a coupling with a gearbox 104. The example gearbox 104 is disclosed by way of example as a mechanical drive device that uses shaft power generated by the core engine 22 or another actuator to power the exhaust compressor 106.

The example exhaust compressor 106 operates to increase the pressure of the exit flow 96 exiting the condenser 54 to a level compatible with pressures of the first exhaust gas flow 46. Pressures compatible with the first exhaust gas flow 46 are pressures that provide for recombination within the mixer 82 to generate the recombined flow 80 that is communicated to the nozzle 84.

Moreover, the exhaust compressor 106 is operable to control of flow of the second exhaust gas flow 48 through the condenser 54. The second exhaust gas flow 48 is controlled to tailor operation of the condenser 54 to the cooling capacity of the fuel flow 38. The cooling capacity of the fuel flow 38 may vary as the fuel flow rate varies during engine operation. When the fuel flow 38 is flowing at lower rates, the flow of the second exhaust gas flow 48 is reduced and more of the exhaust gas flow 40 is driven through the first passage 100 as the first exhaust gas flow 46. As fuel flow increases, the volume of the second exhaust gas flow 48 is increased to match increased cooling capacity of the fuel flow.

Accordingly, the example propulsion system provides improved water extraction capability by extracting water from only a partial portion of the exhaust gas flow and controlling flows through the condenser to match cooling capacity of the cold sink fuel flows. Moreover, the exhaust compressor compensates for pressure losses through the condenser to improve recombination and communication of exhaust gas flows through a nozzle.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A method of operating an aircraft propulsion system, the aircraft propulsion system comprising a compressor section where an inlet airflow is compressed, a combustor section where the compressed inlet airflow is mixed with fuel and ignited to generate an exhaust gas flow that is communicated through a core flow path, a turbine section through which the exhaust gas flow expands to generate a mechanical power output, wherein the exhaust gas flow is split into a first exhaust gas flow and a second exhaust gas flow, a condenser where water from the second exhaust gas flow is condensed and extracted, wherein the first exhaust gas flow bypasses the condenser, an evaporator system where thermal energy from at least the second exhaust gas flow is utilized to generate a steam flow from at least a portion of water extracted by the condenser for injection into the core flow path, an exhaust compressor which receives the second exhaust gas flow from the condenser and compresses the second exhaust gas flow to form a higher pressure exit flow, and an exhaust mixer downstream from the condenser, wherein the first exhaust gas flow and the higher pressure exit flow are merged within the exhaust mixer, the method comprising:
generating the exhaust flow containing a mixture of steam, compressed air, and fuel;
splitting the generated exhaust flow into the first exhaust flow and the second exhaust flow with the second exhaust flow being less than half of the generated exhaust flow;
thermally communicating the second exhaust flow with a cold sink in the condenser for cooling the second exhaust flow;
condensing and extracting water from the cooled second exhaust flow; and
controlling the second exhaust flow through the condenser by selectively operating the exhaust compressor based on a cooling capacity of the cold sink.

2. The method as recited in claim 1, wherein the cold sink includes a heat transfer circuit in thermal communication with the cold sink flow and the condenser, wherein the heat transfer circuit is configured to cool the second exhaust flow in the condenser.

3. The method as recited in claim 1, generating a steam flow with thermal energy from the generated exhaust flow and injecting at least portion of the steam flow into a core flow path.

4. A turbine engine assembly comprising:
a compressor section where an inlet airflow is compressed;
a combustor section where the compressed inlet airflow is mixed with fuel and ignited to generate an exhaust gas flow that is communicated through a core flow path;
a turbine section through which the exhaust gas flow expands to generate a mechanical power output, wherein the exhaust gas flow is split into a first exhaust gas flow and a second exhaust gas flow;
a condenser where water from the second exhaust gas flow is condensed and extracted, wherein the first exhaust gas flow bypasses the condenser;
an evaporator system where thermal energy from at least the second exhaust gas flow is utilized to generate a steam flow from at least a portion of water extracted by the condenser for injection into the core flow path; and
an exhaust compressor which receives the second exhaust gas flow from the condenser and compresses the second exhaust gas flow to form a higher pressure exit flow; and
an exhaust mixer downstream from the condenser, wherein the first exhaust gas flow and the high pressure exit flow are merged within the exhaust mixer.

5. The turbine engine assembly as recited in claim 4, wherein thermal energy from the first exhaust gas flow and the second exhaust gas flow is utilized to generate the steam flow.

6. The turbine engine assembly as recited in claim 4, wherein the second exhaust gas flow is less than or equal to half of a total exhaust gas flow generated in the combustor section.

7. The turbine engine assembly as recited in claim 4, further including a heat transfer circuit in thermal communication with a cold sink flow and the condenser, wherein the heat transfer circuit is configured to cool the second exhaust gas flow in the condenser.

8. The turbine engine assembly as recited in claim 4, including a steam turbine where a steam flow generated by the evaporator system is expanded before communication to the combustor section.

9. The turbine engine assembly as recited in claim 8, wherein an exit steam flow from the steam turbine is reheated by the exhaust gas flow prior to communication to the combustor section.

10. The turbine engine assembly as recited in claim 4, wherein the exhaust compressor is driven by an electric motor.

11. The turbine engine assembly as recited in claim 10, further including a controller programmed for operating the electric motor to control flow through the condenser to tailor condenser operation to an available cooling capacity.

12. The turbine engine assembly as recited in claim 4, wherein the exhaust compressor is coupled to a drive shaft driven by a mechanical drive device.

13. An aircraft propulsion system comprising:
a propulsor for generating propulsive thrust;
a core engine comprising a compressor section, a combustor section, and a turbine section, wherein inlet airflow is compressed in the compressor section, mixed with fuel, and ignited in the combustor section to generate an exhaust gas flow that is communicated through a core flow path and expanded through the turbine section to generate shaft power utilized to drive the propulsor, wherein the exhaust gas flow is split into a first exhaust gas flow and a second exhaust gas flow and the second exhaust gas flow is equal to or less than half of the exhaust gas flow;

a condenser where water from the second exhaust gas flow is condensed and extracted;

an evaporator system where thermal energy from at least the second exhaust gas flow is utilized to generate a steam flow from at least a portion of water extracted by the condenser for injection into the core flow path;

a cold sink in thermal communication with the second exhaust gas flow in the condenser for cooling the second exhaust gas flow;

an exhaust compressor which receives the second exhaust gas flow from the condenser, compresses the second exhaust gas flow to form a higher pressure exit flow and is configured to control the second exhaust gas flow through the condenser to tailor water extraction to an available cooling capacity provided by the cold sink; and an exhaust gas mixer downstream from the condenser, wherein the first exhaust gas flow and the higher presser exit flow are merged within the exhaust mixer.

14. The aircraft propulsion system as recited in claim 13, wherein the cold sink includes a heat transfer circuit in thermal communication with a cold sink flow and the condenser, wherein the heat transfer circuit is configured to cool the second exhaust gas flow in the condenser.

15. The aircraft propulsion system as recited in claim 13, wherein the exhaust compressor is driven by an electric motor operated by a controller programmed for operating the electric motor to control the second exhaust gas flow through the condenser.

16. The aircraft propulsion system as recited in claim 13, wherein the exhaust compressor is coupled to a drive shaft driven by a mechanical drive device.

17. The aircraft propulsion system as recited in claim 13, including a steam turbine where steam flow generated by the evaporator system is expanded before communication to the core flow path and an exit steam flow from the steam turbine is reheated by the exhaust gas flow prior to communication to the core flow path.

18. The aircraft propulsion system as recited in claim 13, further including a fuel system for communicating a non-carbon based fuel to the combustor section of the core engine.

* * * * *